(12) United States Patent
Kottke et al.

(10) Patent No.: US 6,769,185 B2
(45) Date of Patent: Aug. 3, 2004

(54) GEARBOX HEAD

(75) Inventors: Joachim Kottke, Remseck (DE); Erik Ames, Korb (DE)

(73) Assignee: Andreas Stihl AG & Co. (DE)

( * ) Notice: Subject to any disclaimer, the term of this patent is extended or adjusted under 35 U.S.C. 154(b) by 143 days.

(21) Appl. No.: 10/026,100

(22) Filed: Dec. 21, 2001

(65) Prior Publication Data

US 2002/0078812 A1 Jun. 27, 2002

(30) Foreign Application Priority Data

Dec. 21, 2000 (DE) ..................................... 200 21 586 U

(51) Int. Cl.⁷ ................................................ B26B 7/00
(52) U.S. Cl. ............................ 30/276; 30/347; 74/417; 74/606 R; 475/230
(58) Field of Search .......................... 30/276, 388, 347; 83/488, 698.41, 606, 489, 491, 171, 477.1; 475/159, 31, 161, 114, 160, 230, 248, 331; 476/14, 8, 9; 74/606 A, 606 R, 423, 467, 459.5, 417; 464/7, 17, 183; 56/12.7, 12.8; 277/597, 930

(56) References Cited

U.S. PATENT DOCUMENTS

| | | | | |
|---|---|---|---|---|
| 1,912,737 A | * | 6/1933 | Svenson | 417/440 |
| 1,974,803 A | * | 9/1934 | Chilton | 74/606 R |
| 2,668,601 A | * | 2/1954 | Keese | 184/11.1 |
| 4,086,759 A | * | 5/1978 | Karstensen et al. | 60/39.08 |
| 4,286,675 A | * | 9/1981 | Tuggle | 173/213 |
| 4,641,431 A | * | 2/1987 | Leming et al. | 30/276 |
| 4,902,202 A | * | 2/1990 | Bowden | 417/310 |
| 5,103,561 A | * | 4/1992 | Harada et al. | 30/276 |
| 5,483,733 A | * | 1/1996 | Hoffman | 29/463 |
| 5,566,455 A | * | 10/1996 | Hagstrom | 30/276 |
| 5,890,885 A | * | 4/1999 | Eckerle | 418/168 |
| 5,911,793 A | * | 6/1999 | Kaye | 74/606 R |
| 6,087,744 A | * | 7/2000 | Glauning | 310/58 |
| 6,273,214 B1 | * | 8/2001 | Schumacher | 184/6.12 |
| 6,471,614 B1 | * | 10/2002 | Cihlar et al. | 475/159 |

* cited by examiner

Primary Examiner—Boyer D. Ashley
(74) Attorney, Agent, or Firm—R W Becker & Associates; R W Becker

(57) ABSTRACT

A gearbox head is provided for a motor-driven, manually guided implement for driving a cutting tool. The gearbox head includes a housing having a planetary gear arrangement, preferably a bevel gearing. At least one gear of the planetary gear arrangement is fixedly disposed on a shaft that, for venting the housing, is provided with a channel that opens out beyond the housing via an outer opening and opens out into an interior of the housing via at least one inner opening, which is formed by at least one portion of the channel that extends essentially radially relative to the longitudinal axis of the shaft.

17 Claims, 3 Drawing Sheets

GEARBOX HEAD

BACKGROUND OF THE INVENTION

The present invention relates to a gearbox head for a motor-driven, manually guided implement for driving a cutting tool.

Such a gearbox head for an implement having a rapidly rotating cutting tool, for example in conjunction with a brushcutter, trimmer or edger, is formed with a housing having minimal exterior dimensions. Disposed in the gearbox head housing for driving the cutting tool is a planetary gear arrangement that is preferably embodied as a bevel gearing. Such a bevel gearing is lubricated by a lubricant filling that is provided in the housing. Such a gearbox head effects an adaptation of the speed of the drive motor to the cutting tool along with an appropriate positioning of the cutting tool on the manually-guided implement. In order, during operation of the manually-guided implement, to provide a pressure equalization between the interior and the exterior of the gearbox head, a channel is provided in a gear shaft of the planetary gear arrangement, or an appropriate groove is provided in a bearing seat for a shaft of the planetary gear arrangement.

Since during operation of the gearbox head operating temperatures of greater than 100° C. can occur due to the high speeds, an increase in pressure is effected in the gearbox head that must be compensated for via the channel. With heretofore known gearbox heads, lubricant can enter the pressure equalization channel and can lead to losses of lubricant. As a result, it is necessary to refill the gearbox head with lubricant.

It is therefore an object of the present invention to improve a gearbox head of the aforementioned general type in such a way that it is possible to have a long lasting operation of the gearbox head without requiring maintenance.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
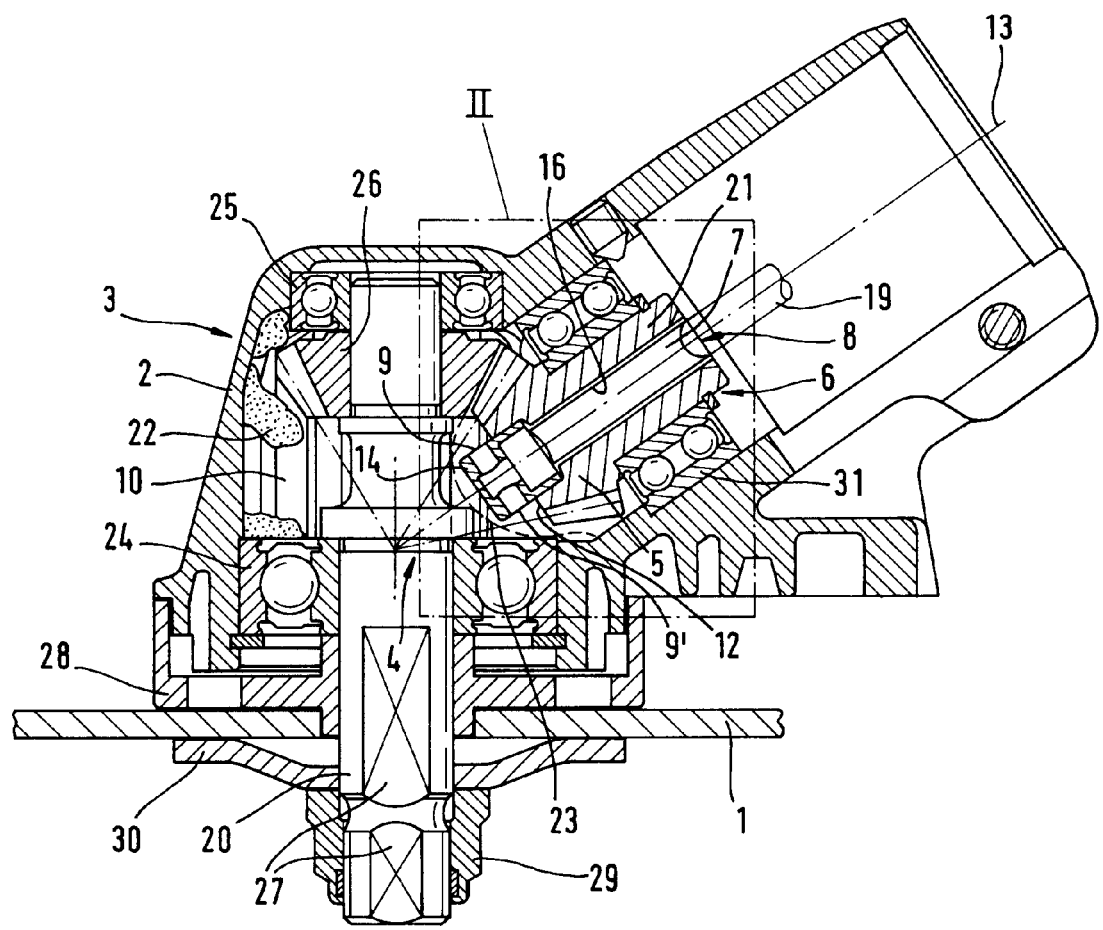
FIG. 1 is a longitudinal cross-sectional view through one exemplary embodiment of an inventive gearbox head.

The gearbox head of the present invention comprises a housing having a planetary gear arrangement, preferably a bevel gearing, wherein at least one gear of the planetary gear arrangement is fixedly disposed on a shaft that, for venting the housing, is provided with a channel that opens out beyond the housing via an outer opening and opens out into an interior of the housing via at least one inner opening, and wherein the inner opening is formed by at least one portion of the channel that extends essentially radially relative to a longitudinal axis of the shaft.

To prevent a loss of lubricant from the interior of the housing of the gearbox head via the channel in the shaft of the gear, the channel is guided in a radial direction, relative to the gear shaft, in the vicinity of the inner opening. The inner opening is spaced radially relative to the longitudinal axis of the gear shaft. This ensures that during operation of the gearbox head, no lubricant, especially lubricating grease, can pass to the outside out of the interior of the gearbox head via the inner opening and the channel, since during operation of the gearbox head the shaft with the gear rotates at high speed. In order to be able to exit out of the channel and to the outside out of the housing, the lubricant would have to enter through the inner opening radially in a direction toward the channel, which preferably extends in the core of the shaft, all of which is counter to the centrifugal force that exists. This is also precluded by the inner pressures in the housing that occur during operation of the gearbox head. Due to the fact that high radial accelerations exist in the region in which the inner opening is disposed, there is ensured that only negligible amounts of lubricant are present at the inner opening since the lubricant is accelerated away from the wall portions at which the inner openings are disposed.

However, media that have less of a tendency to adhere, such as air or gas, can still escape. Thus, in accordance with principles of physics, a build up of pressure in the gear arrangement, and an increase in temperature that is associated therewith, are avoided (isochoric equalization).

When viewed in the axial direction of the shaft, the inner opening can be disposed between the gear and the inner wall of the housing in the interior of the housing radially relative to the shaft or to a shaft of the gear. It can be expedient, when viewed in the axial direction of the shaft, to dispose the inner opening on that end face of the gear that faces the interior of the housing, or a distance from the end face of the gear.

The inner opening can be guided as a blind hole radially from the surface of the shaft to the channel in the interior of the shaft. It can also be expedient to provide two or more inner openings, whereby the inner openings are preferably disposed diametrically opposite one another relative to the longitudinal axis of the shaft. The channel can be embodied as a blind hole having an opening to the outside of the gearbox head, in other words, can have an outer opening. The channel can also be formed through the shaft as an axially extending pilot cut, whereby a closure element at that end of the shaft that faces the interior of the housing serves in this case as an axial closure of the channel. These structural measures ensure that at least a portion of the fluid connection between the inner openings disposed on the shaft and the channel in the interior of the shaft extend at least nearly radially.

It can also be expedient to extend the channel in the closure element itself, and to dispose the inner opening, or a plurality of openings, in the closure element itself. This results in a radial branching off of the channel toward the inner openings in the closure element itself. For this purpose, the closure element preferably engages in a positive and sealing manner in the channel.

It can be expedient to provide the channel with a polygonal or quadratic cross-sectional configuration, whereby this configuration is approximately equal over the axial length of the channel. These structural measures enable a hollow shaft portion of a drive or output shaft to be fixed in position in the channel. The purpose of the inner openings of the shaft is for pressure equalization of the gearbox head, so that the inner width of the inner openings can be kept small. The inner width of the inner openings, which preferably have a circular cross-sectional configuration, is preferably less than the inner width of the channel. It can be expedient to form the closure element as a cylindrical turned part of lightweight metal. The shaft with a channel, and a gear, are preferably monolithically formed from steel. This steel component is preferably formed as a forged part with subsequent finishing machining. In this connection, the axial extension of the shaft is preferably delimited as a hub of the gear. Depending upon the application of the gearbox head, it can be expedient to embody the planetary gear arrangement as a straight or helical toothed spur-gear system.

Further specific features of the present invention will be described in detail subsequently.

DESCRIPTION OF PREFERRED EMBODIMENTS

Referring now to the drawings in detail, FIG. 1 is a longitudinal cross-sectional view through a gearbox head of a motor-driven, manually guided implement, such as a brushcutter or trimmer. The gearbox head has a housing 2 in which is disposed an output shaft 20 that extends over the height of the housing 2 and is part of a planetary gear arrangement 3 that is embodied as a bevel gearing 4. The output shaft 20 is held in the housing 2 by two roller or ball bearings 24,25. A bevel gear 26 is held on the output shaft 20 between these ball bearings in such a way so as not to rotate relative to the output shaft; in the installed state of the gearbox head, the bevel gear 26 is held in such a way that it cannot be displaced axially. The bevel gear 26 meshes with a gear 5 of a drive shaft 19, with the gear 5 being embodied as a bevel gear. In the region where the output shaft 20 extends out of the housing 2, the periphery of the output shaft is provided with flat surfaces 27 against which rest corresponding edges of a disk-shaped retaining element 28. This disk-shaped retaining element 28, which has a pan-shaped cross-sectional figuration and is provided with a rim that is directed toward the housing 2, serves as an axial abutment for a cutting tool 1. In the illustrated embodiment, the cutting tool 1 is provided as a rigid blade of a brushcutter or trimmer. The cutting tool 1 is held on the output shaft 20 with the aid of a tightening nut 29 and a thrust washer 30.

The interior 10 of the housing 2 is provided with a lubricant filling 22, preferably with lubricating grease. The gear 5 is fixed in position on a shaft 6. In the illustrated embodiment, the gear 5 is monolithically embodied with the shaft 6. The shaft 6 assumes the function of a hub 21 for the gear 5 whereby the hub 21 has an axial length that is approximately one and one-half times that of the gear 5. The hub 21 extends through a roller or ball bearing 31. By means of the ball bearing 31, the gear 5 is mounted in the housing 2 in a taper bore or overhung manner. The shaft 6, i.e. the hub 21, is provided with a channel 7 for venting and pressure equalization of the gearbox head. The channel 7 is provided with an outer opening 8 that opens out beyond the housing 2. From the outer opening 8, the channel 7 is guided to an inner opening 9 in the interior 10 of the housing 2. In this connection, proceeding from the outer opening 8, the channel 7 extends approximately coaxially relative to the longitudinal axis 13 of the shaft 6, i.e. of the hub 21, in the direction toward the inwardly disposed end of the shaft 6, and then merges into a radially extending portion of the channel that at the inner openings 9,9' opens out at a surface of the shaft 6. The inner openings 9,9' are disposed in a zone 23 that contains little lubricant, or in a zone in the interior 10 of the housing 2 that is free of lubricant.

As a result of these structural measures, it is possible to have a venting or a pressure equalization between the interior and the exterior of the housing 2 by means of the inner openings 9,9', the channel 7, and the outer opening 8. Since the inner opening 9,9' are disposed in the zone 23 that contains the least amount of lubricant, it is possible to reliably prevent lubricant from entering the interior openings 9,9'. Due to the fact that the channel 7, and in particular the inner openings 9,9', are disposed in a component that rotates in high speeds, and in particular as a result of the fact that the inner openings 9,9' are radially disposed on the shaft 6 or the hub 21, there is ensured that during operation of the gearbox head, a centrifugal acceleration is effected on a portion of lubricant that has penetrated somewhat into the channel 7, and the lubricant portion is returned into the interior of the housing 2. This reliably prevents a loss of lubricant out of the housing 2 via the channel 7.

Figure 4:
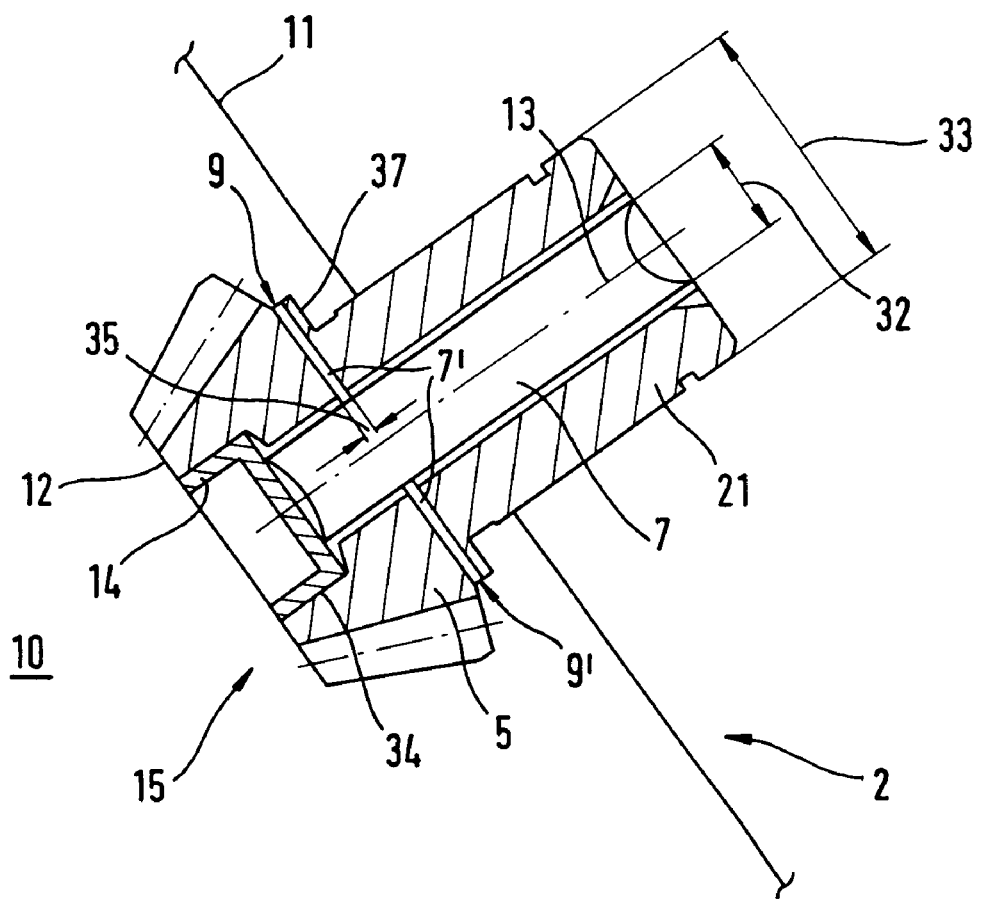
FIG. 4 is a longitudinal cross-sectional view through a further gear having a venting channel.

As shown in the longitudinal cross-sectional view through a gear 5 with the hub 21 of FIG. 4, the channel 7 is formed with a diameter 32 that is approximately half as great as the diameter 33 of the hub 21. The channel 7 is guided axially through the hub 21 and the gear 5 that is monolithically formed with the hub 21. On one end face 12 of the gear 5, the channel 7 is closed off by means of a cylindrical closure element 14. From that end 15 of the shaft 6 that faces the interior 10 of the housing, the closure element 14 is fitted or set in a receiving bore 34, preferably by being press fit, adhesively connected or soldered, or is fixed in position on the axial end 15 in some other suitable frictional and/or positive manner. In the embodiment illustrated in FIG. 4, the channel 7 is provided with two or more radially extending lateral channels 7' which, when viewed in the axial direction of the shaft 6, are disposed between the gear 5 and the inner wall 11 of the housing 2, whereby the channels 7' respectively extend to an inner opening 9,9'. These lateral channels 7' are preferably disposed in a widened shaft 37 of the gear 5, with the diameter 35 of the channel 7' being such that the sum of the cross-sectional areas of the channels 7' is less than the cross-sectional area of the channel 7 with its diameter 32. In the illustrated embodiment, the cross-sectional areas of the openings 9,9' are equal to those of the lateral channels 7'.

Figure 2:
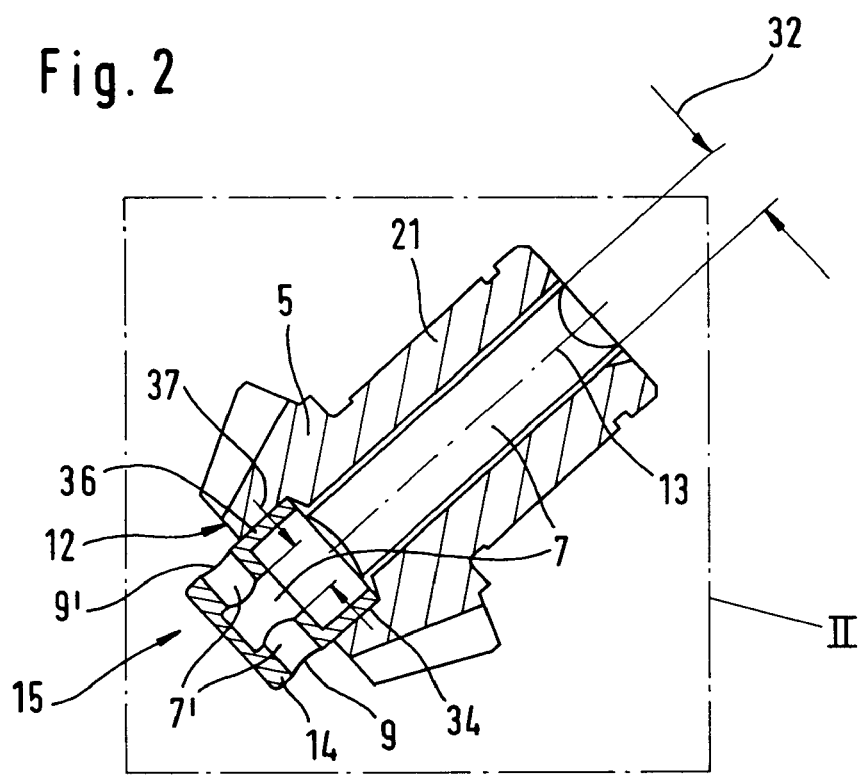
FIG. 2 is a longitudinal cross-sectional view through a gear that is provided with an inventive venting channel.
Figure 3:
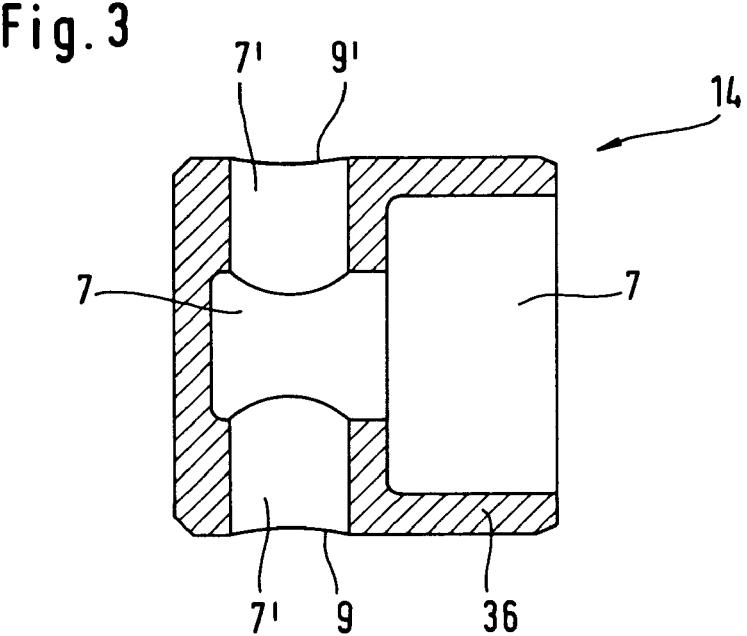
FIG. 3 is a longitudinal cross-sectional view through a closure element of a gear.

As indicated in FIG. 2 in a longitudinal cross-sectional view through the gear 5 with the hub 21, with FIG. 2 showing the partial view II in FIG. 1, it can be expedient for the inner openings 9,9', instead of having the position shown in FIG. 4, to be disposed adjacent to that end face 12 of the gear 5 that faces the interior 10 of the housing 2. For this purpose, the closure element 14 for the axial end 15 of the shaft 6, or of the hub 21, is formed as an installed part that assumes the radial deflection of the channel 7 into the radially extending lateral channels 7,7' toward the inner openings 9,9'. This is clarified in FIG. 3 via a longitudinal cross-sectional view through the closure element 14.

It can be expedient to provide more than two lateral channels 7' and inner openings 9,9'. In the same manner as for the closure element 14 shown in FIG. 4, the closure element is fixed in position in a bore 34, the diameter of which is greater than the channel diameter 32. In the illustrated embodiment, the closure element 14 has a cylindrical shape. The channel 7 is guided in the closure element 14 toward the end 15 in a widened, tubular connector 36 of the closure element. The connector 36 has an axial extension that corresponds approximately to the depth of the bore 34. By means of the connector 36, the closure element 14 is sealingly fixed in position in the bore 34 of the gear 5. In the installed state of the closure element 14 against the gear 5, the channel 7 extends coaxially to the longitudinal axis 13 of the shaft or hub in the closure element 14. Prior to where the channel 7 branches off to the lateral channels 7', the channel 7 has a smaller diameter 34 (FIG. 2) in the closure element 14 than is its diameter 32 in the hub 21 or shaft 6. The lateral channels 7' open into the inner openings 9,9', which in the illustrated embodiment are disposed diametrically opposite one another on the shaft or hub relative to the longitudinal axis 13. The inner openings 9,9' have an inner width of approximately 3 mm and are preferably formed with a circular cross-sectional configuration.

In the installed state of the gearbox head, the closure element 14 initially extends into the lubricant filling 22 in the interior 10 of the housing 2. During operation of the planetary gear arrangement 3, the closure element 14 rotates at the same speed as does the gear 5 or as does the drive shaft 19 that drives the gear 5. In the illustrated embodiment, this can be approximately 10,000 rotations per minute. Lubricant that may be disposed at the inner openings 9,9' is thereby centrifuged or flung from the surface of the closure element 14, and the inner openings 9,9' are exposed in the housing. There is formed a permanent lubricant-free zone 23 in which lubricant adheres to the closure element 14 only as a film. When viewed in the longitudinal cross-section of FIG. 1, the zone 23 is disposed approximately hemispherically about the closure element 14. The lubricant is preferably highly viscous grease. It can be expedient to form the closure element 14 as a turned part of lightweight metal, preferably aluminum, and to fix the base of the closure element 14 in position in the bore 34 of the gear 5 via a press fit. It is additionally expedient to form the cross-sectional profile of the channel 7 approximately equally over a large portion of its axial length. The cross-sectional profile is preferably polygonal or quadratic. This makes it possible to fixedly dispose in the channel 7 a shaft portion 16 of the drive shaft 19 that has a shape that is complementary to that of the profile. So that these measures do not adversely affect the pressure equalization in the chamber 7, the shaft portion 16 is non-rotatably held in the channel 7 with play; the shaft portion 16 can also be provided with a longitudinal groove or as a hollow profile. The shaft portion 16 is preferably removably inserted into the channel 7. It can also be expedient to form the openings 8 and 9 with the channel 7 as part of the output shaft 20, and to carry out the pressure equalization and the venting of the gearbox head via the output shaft 20.

Instead of a bevel gearing, all types of planetary gear arrangements could be used as a function of the intended application of the gearbox head.

The specification incorporates by reference the disclosure of German priority document 200 21 586.8 filed Dec. 21, 2000.

The present invention is, of course, in no way restricted to the specific disclosure of the specification and drawings, but also encompasses any modifications within the scope of the appended claims.

What is claimed is:

1. A gearbox head for a motor-driven, manually guided implement for driving a cutting tool, said gearbox head comprising:
    a housing having a planetary gear arrangement;
    wherein at least one gear of said planetary gear arrangement is fixedly disposed on a shaft that, for venting said housing, is provided with a channel that opens out beyond said housing via an outer opening and opens out into an interior of said housing via at least one inner opening; and
    wherein said at least one inner opening is formed by at least one portion of said channel that extends essentially radially relative to a longitudinal axis of said shaft.

2. A gearbox head according to claim 1, wherein said planetary gear arrangement is a bevel gearing.

3. A gearbox head according to claim 1, wherein said at least one inner opening, when viewed in the axial direction of said shaft, opens out into the interior of said housing between said at least one gear and an inner wall of said housing.

4. A gearbox head according to claim 1, wherein said at least one inner opening, when viewed in the axial direction of said shaft, is disposed on that end face of said at least one gear that faces the interior of said housing.

5. A gearbox head according to claim 1, wherein said at least one essentially radially extending portion of said channel is formed by radially extending lateral channels.

6. A gearbox head according to claim 1, wherein said shaft is hollow due to the presence of said channel, and is monolithically formed with said at least one gear to form a hub therefor.

7. A gearbox head according to claim 1, wherein said channel opens into the interior of said housing via two inner openings.

8. A gearbox head according to claim 7, wherein said inner openings are disposed diametrically opposite one another relative to said longitudinal axis of said shaft.

9. A gearbox head according to claim 1, wherein said channel has a cross-sectional configuration that provides for positive accommodation of a shaft portion.

10. A gearbox head according to claim 9, wherein said cross-sectional configuration is approximately identical over a length of said channel.

11. A gearbox head for a motor-driven, manually guided implement for driving a cutting tool, said gearbox head comprising:
    a housing having a planetary gear arrangement;
    wherein at least one gear of said planetary gear arrangement is fixedly disposed on a shaft that, for a venting of said housing, is provided with a channel that opens out beyond said housing via an outer opening and opens out into an interior of said housing via at least one inner opening;
    wherein said at least one inner opening is formed by at least one portion of said channel that extends essentially radially relative to a longitudinal axis of said shaft; and
    wherein said channel is closed off by a closure element that is provided on an end of said shaft that faces the interior of said housing.

12. A gearbox head according to claim 11, wherein said channel is guided into said closure element and wherein said at least one inner opening is disposed on a surface of said closure element.

13. A gearbox head according to claim 11, wherein said closure element is provided with a connector that engages into said channel for holding said closure element in said shaft.

14. A gearbox head according to claim 11, wherein said closure element is formed from lightweight metal.

15. A gearbox head according to claim 14, wherein said closure element is a cylindrical turned part and is disposed in said channel via a press fit.

16. A gearbox head for a motor-driven, manually guided implement for driving a cutting tool, said gearbox head comprising:
    a housing having a planetary gear arrangement;
    wherein at least one gear of said planetary gear arrangement is fixedly disposed on a shaft that, for a venting of said housing, is provided with a channel that opens out beyond said housing via an outer opening and opens out into an interior of said housing via at least one inner opening;
    wherein said at least one inner opening is formed by at least one portion of said channel that extends essentially radially relative to a longitudinal axis of said shaft; and
    wherein said channel has a polygonal cross-sectional configuration that provides for positive accommodation of a shaft portion.

17. A gearbox head, for a motor-driven, manually guided implement for driving a cutting tool, said gearbox head comprising:
    a housing having a planetary gear arrangement;
    wherein at least one gear of said planetary gear arrangement is fixedly disposed on a shaft that, for a venting of said housing, is provided with a channel that opens out beyond said housing via an outer opening and opens out into an interior of said housing via at least one inner opening, wherein said at least one inner opening has a cross-sectional area that is less than a cross-sectional area of said channel; and wherein said at least one inner opening is formed by at least one portion of said channel that extends essentially radially relative to a longitudinal axis of said shaft.

* * * * *